United States Patent Office 3,094,904
Patented June 25, 1963

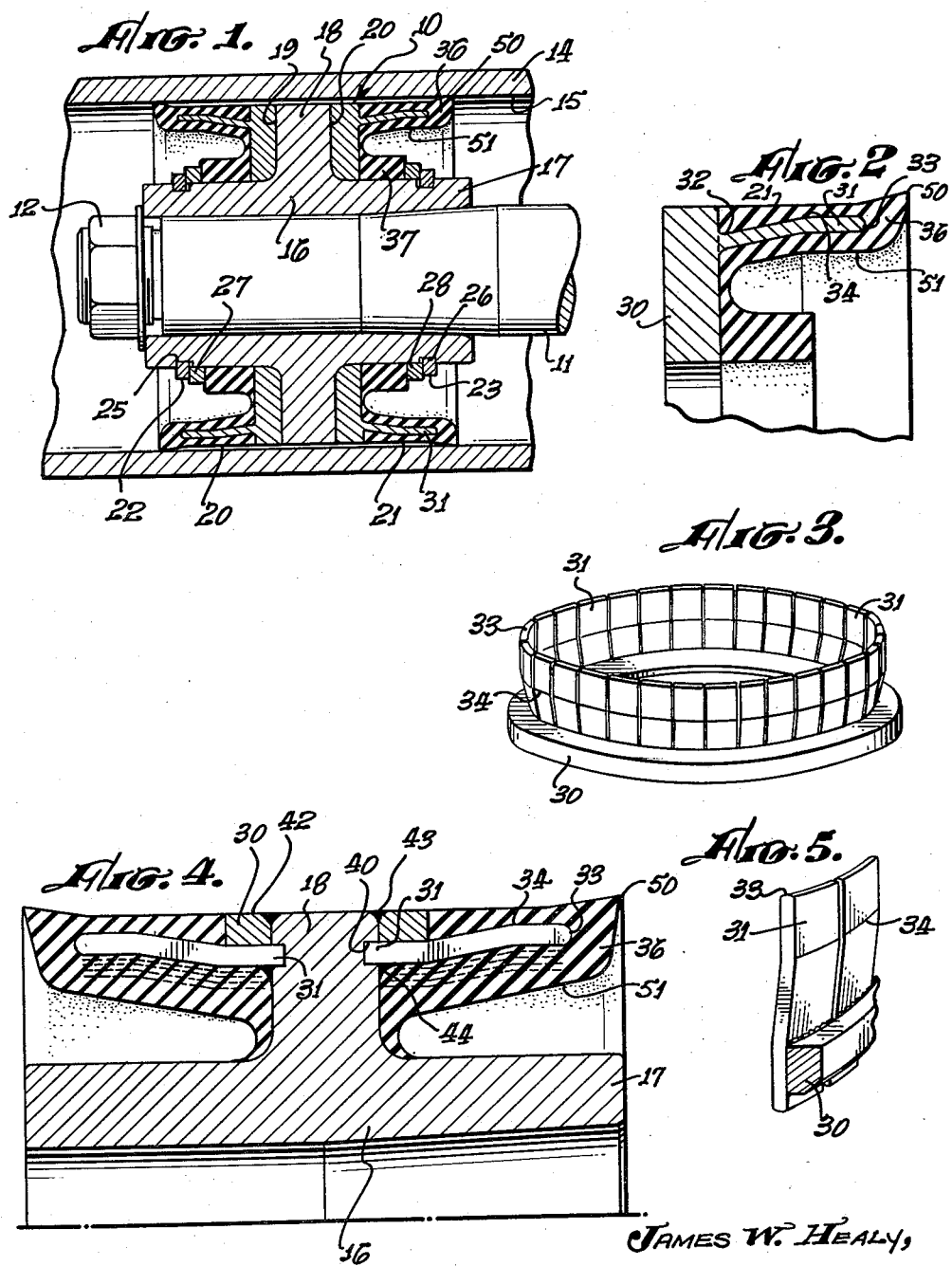

3,094,904
MUD PUMP PISTONS
James W. Healy, 54 Plymouth Road, Wakefield, Mass.
Filed July 11, 1961, Ser. No. 123,274
4 Claims. (Cl. 92—241)

This invention relates to pistons, and more particularly to pistons of the type used in slush pumps.

Slush pumps operate under the most severe conditions. Drilling mud circulated by slush pumps in the drilling of oil wells and the like is highly abrasive and very high pressures are developed in maintaining circulation. These operating conditions dictate the use of resilient packing rings to seal between the piston and cylinder wall of the slush pump used to circulate the drilling mud. The use of resilient packing, however, gives rise to many problems. The problems associated with a piston for mud service at high pressures are many and are complicated by the fact that the mud is both an abrasive and a lubricant. The presence of the mud is undesirable because of the wear it causes to both piston and liner, yet it is necessary to reduce friction at the piston-cylinder interface which is quite important under high pressure.

In the type of piston having an annular packing ring held between a flange and retainer ring on the piston body, the retainer ring does not extend to the outer periphery of the packing ring. On the suction stroke, therefore, the packing may flow over the outer rim of the retainer ring resulting in stresses in the packing at the rim of the retainer ring. Severe damage due to this "pinch-out" frequently occurs.

It is a primary object of the present invention to provide an improved construction for mud pump pistons in which the recovery from a deformed position to a relaxed condition of the packing in a minimum time is provided to reduce wear of the resilient portions of the piston.

It is another object of the present invention to provide an improved construction for mud pump pistons which minimizes the pinch-out or extrusion of the resilient portions of the piston.

It is another object of the present invention to provide an improved construction for mud pump pistons which is economical of construction and efficient in operation.

The present invention comprises a mud pump piston having a body portion adapted to fit upon a piston rod with an annular flange extending outwardly from the body to a dimension less than the inside diameter of the piston, which annular section is located at the longitudinal midpoint of the piston. First and second packing rings are positioned upon the piston body at each side of the annular body section. The packing rings each include an annular series of single leaf springs which are interconnected at the base thereof and extend longitudinally and radially outwardly to the piston lip from the base. The leaf springs are located at a diameter substantially less than the diameter of the cylinder. The rubber body portion of the packing rings surrounds the leaf springs and is constructed such that the outer lip of the packing ring is substantially equal in diameter to the diameter of the cylinder in the relaxed condition. Upon hydraulic loading the lip comes into sealing contact with the cylinder and the leaf springs are deflected radially to bring the portion of the packing ring behind the lip into contact with the cylinder liner to provide further sealing.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:
FIGURE 1 is a cross-sectional view in elevation of the presently preferred embodiment of the present invention;
FIGURE 2 is an enlarged partial view of the packing ring in accordance with the present invention;
FIGURE 3 is a view in perspective of the leaf spring assembly of the present invention;
FIGURE 4 is a partial view in elevation and cross-section of an alternative embodiment of the present invention; and
FIGURE 5 is a partial view of an alternative arrangement of leaf springs as used in accordance with the present invention.

As discussed hereinbefore, in accordance with the present invention it has been found that two primary problems are involved in slush pump pistons of the prior art. The first problem is "pinch-out" or extrusion of the base rubber between the body flange and cylinder wall with subsequent wearing or tearing away of the extruded material. Upon this occurrence it is obvious that the piston will fail as the seal is torn away and the tearing away is progressive due to erosion. The second problem is strain recovery of the rubber. In accordance with the present invention the annular steel leaf springs are so constructed in combination with the rubber portion of the packing ring that in the unloaded position of the piston the body of the piston is either just touching the liner or just out of contact with the liner wall. Upon hydraulic loading the lip provides the initial seal and the leaf springs deflect radially. Thus, the body comes in contact with the liner to provide further sealing. The sealing pressure is at a maximum near the free ends of the leaf springs as described hereinafter and gradually tapers to no loading near the base or fixed end of the leaf springs. On the suction stroke, the hydraulic pressure is relieved and the leaf springs immediately return to a no-load, no-deflection position, thus overcoming the inherently slow recovery of the rubber from which the packing ring is formed. Due to the stiffness of the leaf springs near the fixed ends thereof, there is no radial motion or flowing of the rubber to cause pinch-out.

Referring now to the drawing, there is shown in FIGURES 1–3 a presently preferred embodiment of the present invention. The piston designated generally 10 fits upon a piston rod 11 and is retained thereon by means such as a lock nut 12 at the end of the piston rod. The piston is reciprocal within a cylinder 14 having an inside surface 15. This cylinder is most generally a cylinder liner within the mud pump. The piston includes a piston body 16 which is cylindrical in configuration with an inside surface adapted to be mated with the exterior of the piston rod. The piston body includes a wall portion 17 and an annular body flange 18 which is located at approximately the midpoint of the piston body and defines transversely extending shoulders 19 and 20 at opposite sides thereof. The outside diameter of the body flange is somewhat less than the diameter of the cylinder wall 15. First and second packing rings designated 20 and 21 are positioned at opposite sides of the body flange 18 in bearing contact therewith. The packing rings 20 and 21 are similar in construction but reversed in orientation such that the operation of each is identical depending upon the direction of movement of the piston rod. The packing rings 20 and 21 are retained upon the wall of the piston by means such as snap rings 22 and 23 respectively. The snap rings are positioned within a circumferential groove 25 and 26 in the piston wall. Positioned between the snap rings 25 and 26 and the body of the packing rings is a retaining ring 27 and 28 respectively which is in bearing contact between the snap ring and the body of the piston packing.

Referring now particularly to FIGURES 2 and 3, in accordance with the present invention, there is formed a series of circumferentially spaced single leaf springs which are affixed to or mounted upon an annular ring 30. Each of the leaf springs 31 is similar in construction to the others in the circumferential series. They are circumferentially spaced apart by a predetermined distance and are of predetermined circumferential width as discussed hereinafter.

The total number of leaf springs 31 or spring-like fingers can be varied and in the embodiment shown the spacing between the fingers is minimal and sufficient only to allow complete freedom of movement of the springs radially with respect to one another. The width of each spring 31 as well as the thickness of the material and its resistance to radial deflection will depend upon the operating conditions of the piston. Each of the leaf springs 31 has a cross-sectional configuration as shown in FIGURE 2 wherein the finger tapers outwardly from the root, or base, 32 at which it is connected to the annular ring 30. The finger is generally broad and rectangular in configuration and the slope decreases toward the outer end 33 of the finger at a change-of-slope point 34. One of the primary reasons for the change of flow is easy insertion of the piston into the cylinder during assembly. That is, since the fingers or leaf springs 31 are relatively stiff, it would be difficult, if not impossible, for maintenance personnel to compress them enough for initial insertion of the packing into the cylinder if the taper of the lip extended farther toward the annular ring 30.

Surrounding the annular ring is the rubber packing material 36 which makes up the outer body of the packing 20 and 21. The rubber is positioned to the outside of the annular ring and in general surrounds the plurality of leaf springs 31 with a longitudinal protrusion being provided at the inner diameter of the rubber packing body which protrusion 37 extends along the wall 17 of the piston body to the retaining ring 27 and 28 respectively. The annular ring 30 thus has an outside diameter substantially coincident with the outside diameter of the body flange 18 and the thickness of rubber surrounding the plurality of leaf springs 31 is minimal. Thus, the leaf springs are the major elastic members and the rubber body of the packing serves merely as a sealing member such that a minimum amount of rubber can be used and the recovery time of the rubber is minimized.

In operation in an axial direction there will be some movement of the rubber toward the flange 18 due to both the hydraulic loading and the frictional drag of the cylinder. This will produce shear stresses in the rubber and more importantly, on the rubber-to-metal bond on the surfaces of the leaf springs 31. In some embodiments for particular application of the present invention, if a high degree of rubber movement is experienced, it is sometimes preferable to reinforce the rubber packing with a reinforcing material such as fabric. As discussed hereinbefore, the thickness of the leaf springs will vary dependent upon the pressures encountered in the operation of the piston. The thickness of such leaf springs can be readily determined by one skilled in the art. For example, at a maximum hydraulic pressure of 500 p.s.i. to be encountered, the minimum thickness of the leaf spring should be approximately .056 inch, at 1,000 p.s.i. .079 inch, at 1,500 p.s.i. .097 inch, at 2,000 p.s.i. .112 inch, at 2,500 p.s.i. .125 inch. The above calculations of minimum leaf spring thickness are based upon leaf springs formed of 4130 alloy steel which was used in the presently preferred embodiment of the invention.

Referring now to FIGURE 5, an alternative embodiment of the circumferential series of leaf springs 31 is shown to indicate that rather than forming the leaf springs integrally with the annular ring 30, the springs may be assembled to the annular ring 30 by forming the leaf springs 31 individually and welding them to the inner surface of the ring.

Referring now to FIGURE 4, an alternative embodiment of the present invention is shown utilizing the annular ring and leaf spring assembly of FIGURE 5. In this embodiment a circumferential groove 40 is formed at each side of the radial flange 18 of the piston body and the inner end of the leaf springs 31 are extended into the groove 40. The annular ring 30 then extends outwardly from the leaf springs 31 and has an outside diameter 42 again equal to the outside diameter of the radial flange 18. The annular ring and leaf spring assembly of the alternative embodiment is then affixed to the piston body by welding the annular ring 30 to the radial flange 18 at the circumferential point 43 and at the point of intersection of the leaf springs 31 and the radial flange 18 as at 44. Thus, in the alternative embodiment, the assembly of the piston is permanent.

Thus, the contour and root diameter of the leaf springs, that is, the diameter of the leaf springs at the base where they are affixed or integral with the annular ring 30, together with the contour of the leaf springs is determined such that the leaf springs in the unloaded position retain the lip 50 of the packing material approximately in contact with the cylinder wall 15. Accordingly, the piston is substantially in contact with the cylinder wall at the unloaded position but exerts little or no force upon the cylinder wall. When hydraulic force is exerted upon the face of the piston it acts upon the inner surface 51 of the packing lip to force the packing and leaf springs outwardly such that the lip 50 first comes into contact with the cylinder wall and then additional surface contact is made by the outer surface of the packing as at 51. The sealing pressure thus is at a maximum near the free ends of the leaf springs and gradually tapers to no loading near the base or fixed end of the leaf springs. On the suction stroke, the hydraulic pressure is relieved and the leaf springs immediately return to a no-load, no-deflection position due to the recovery of the leaf springs to the relaxed condition. The inherently slow recovery of the rubber or other packing material is thus overcome. Due to the stiffness of the leaf springs near the fixed end, there is no radial motion or flowing of the rubber to cause pinch-out between the rubber and the annular ring, such as usually occurs between the rubber and the radial flange 18 of a slush pump piston of the type most generally in use in the prior art.

What is claimed is:

1. A pump piston comprising a body adapted to be secured to a rod of a pump for reciprocation within a cylinder, an annular flange extending radially from the body, an annular packing ring positioned on the body in abutment with said flange with the surface of said packing ring opposite said flange providing a pressure face with a packing ring lip at the outer diameter of said pressure face, said packing ring including a body of elastomeric material and a plurality of circumferentially spaced longitudinally extending leaf springs positioned within said elastomeric body, said leaf springs being so constructed and arranged as to normally urge said lip to a diameter substantially equal to but less than the diameter of said cylinder.

2. A pump piston comprising a body adapted to be secured to a rod of a pump for reciprocation within a cylinder, an annular flange extending radially from the body, an annular packing ring positioned on the body in abutment with said flange with the surface of said packing ring opposite said flange providing a pressure face with a packing ring lip at the outer diameter of said pressure face, said packing ring including a body of elastomeric material and a plurality of circumferentially spaced longitudinally extending leaf springs positioned within said elastomeric body, said elastomeric body defining a longitudinally extending indentation in the pressure face thereof, said elastomeric body being radially expansible into sealing contact with said cylinder when pressure is exerted on said indentation, said leaf springs being so constructed and arranged as to normally urge said lip to a diameter substantially equal to but less than the diameter of said cylinder.

3. A pump piston comprising a body adapted to be secured to a rod of a pump for reciprocation within a cylinder, an annular flange extending radially from the body, an annular packing ring positioned on the body in abutment with said flange with the surface of said packing ring opposite said flange providing a pressure face with a packing ring lip at the outer diameter of said pressure face, said packing ring including a body, of elastomeric material and a plurality of circumferentially spaced longitudinally extending leaf springs positioned within said elastomeric body, said leaf springs being affixed at the inner end thereof to a rigid annular ring positioned proximate said flange, the outer end of each of said springs being proximate said lip, said elastomeric body defining a longitudinally extending indentation in the pressure face thereof, said elastomeric body being radially expansible into sealing contact with said cylinder when pressure is exerted on said indentation, said leaf springs being so constructed and arranged as to normally urge said lip to a diameter substantially equal to but less than the diameter of said cylinder.

4. A pump piston comprising a body adapted to be secured to a rod of a pump for reciprocation within a cylinder, an annular flange extending radially from the body, an annular packing ring positioned on the body in abutment with said flange with the surface of said packing ring opposite said flange providing a pressure face with a packing ring lip at the outer diameter of said pressure face, said packing ring including a body of elastomeric material and a plurality of circumferentially spaced longitudinally extending leaf springs positioned within said elastomeric body, said leaf springs being affixed at the inner end thereof to said annular flange, the outer end of each of said springs being proximate said lip, said elastomeric body defining a longitudinally extending indentation in the pressure face thereof, said elastomeric body being radially expansible into sealing contact with said cylinder when pressure is exerted on said indentation, said leaf springs being so constructed and arranged as to normally urge said lip to a diameter substantially equal to but less than the diameter of said cylinder.

References Cited in the file of this patent
UNITED STATES PATENTS

| | | |
|---|---|---|
| 1,613,066 | Turner | Jan. 4, 1927 |
| 2,051,262 | MacClatchie | Aug. 18, 1936 |
| 2,325,556 | Taylor et al. | July 27, 1943 |
| 2,676,075 | Stone | Apr. 20, 1954 |
| 2,723,721 | Corsette | Nov. 15, 1955 |
| 2,887,347 | Losey | May 19, 1959 |